United States Patent Office 3,369,972
Patented Feb. 20, 1968

3,369,972
NUCLEAR REACTOR FUEL ELEMENT WITH ATTACHED THERMOCOUPLE
Stanley Charles Seymour, Whetstone, England, assignor to The English Electric Company Limited, London, England, a British company
Filed Jan. 18, 1966, Ser. No. 521,268
Claims priority, application Great Britain, Jan. 22, 1965, 2,878/65
5 Claims. (Cl. 176—68)

This invention relates to nuclear reactor fuel element assemblies having at least one thermocouple hot junction attached thereto and a cable attached to each of said one or more hot junctions and leading along the assembly to a point remote therefrom.

It is common practice in such an assembly to provide a free loop in the thermocouple cable adjacent the fuel element so that on application of a predetermined tension to the cable the loop breaks. The cable, apart from a comparatively short portion which remains attached to the hot junction, can then be withdrawn from the fuel element, for instance before removal of the fuel element from the reactor.

According to the invention, in such a fuel element assembly the portion of each cable between a middle point of the corresponding loop and hot junction is secured to the fuel element assembly so that on application of a predetermined tension to the cable said loop breaks at its middle point, whereby leaving the greater portion of the cable free to be withdrawn from the assembly. Straightening means are provided on the fuel element assembly, said greater portion of each said cable being arranged when in position in the assembly to pass through the straightening means so that on withdrawal of said greater portion the broken end thereof passes through the straightening means whereby a hook formed on said end in breaking said loop may be straightened.

A nuclear reactor fuel element assembly in two forms according to the invention will now be described by way of example and with reference to the accompanying drawings of which:

Figure 1:
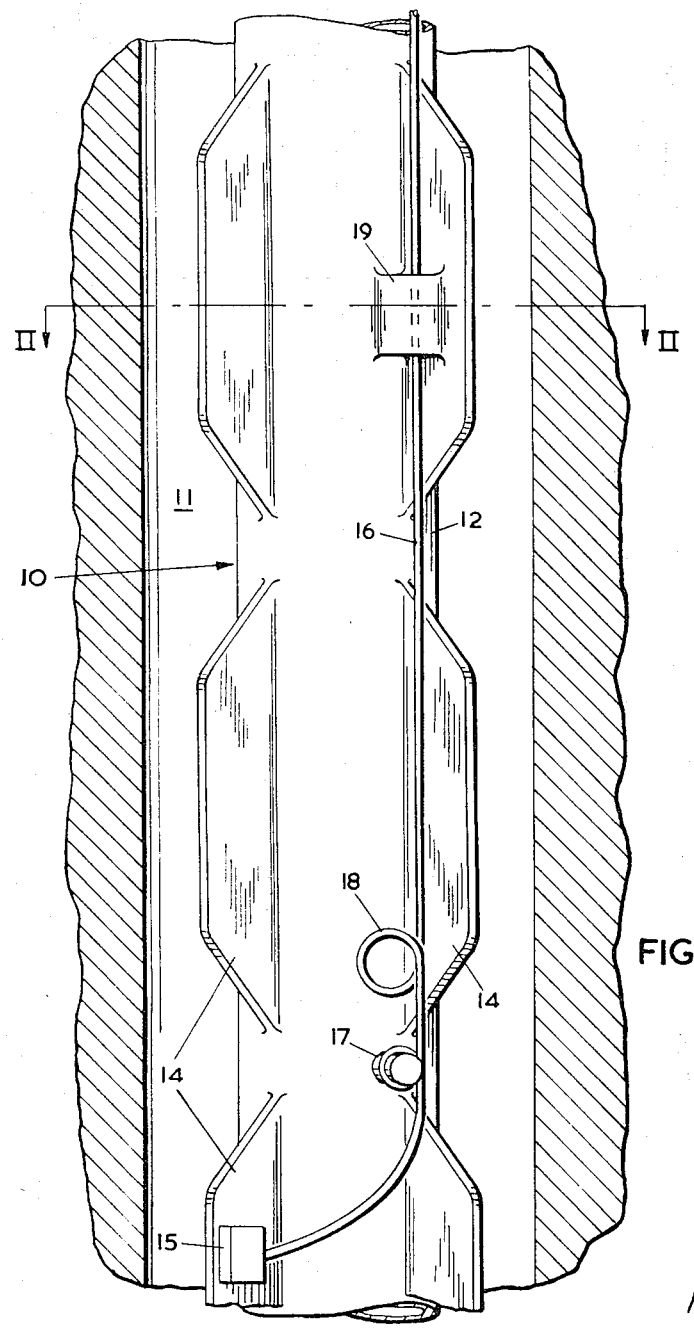
FIG. 1 is a part-sectional elevational view showing part of a thermocouple-bearing fuel element for a gas-cooled nuclear reactor, in position in a fuel channel of the reactor.
Figure 2:
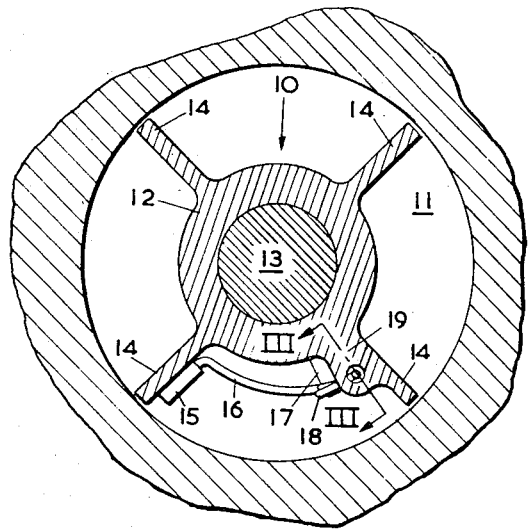
FIG. 2 is a sectional plan view taken on the line II—II of FIG. 1.
Figure 3:
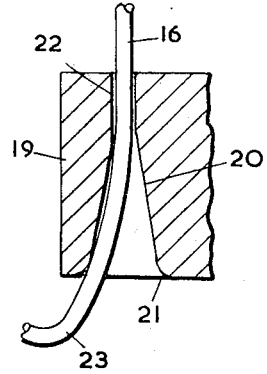
FIG. 3 is an enlarged sectional broken away view taken on the line III—III of FIG. 2 and showing the straightening device.

With reference to FIGS. 1 to 3, the fuel element is indicated at 10 and the fuel channel at 11. The fuel element 10 comprises a fuel can 12 enclosing nuclear fuel 13 and having radially-extending splitter fins 14 arranged on its outside. To one of the splitter fins 14 the hot junction 15 of a thermocouple (hereinafter called "the thermocouple 15") is fixed, for measuring the temperature of reactor coolant gas passing up through fuel channel 11.

A thermocouple cable 16 leads upwardly from the thermocouple 15 and is secured round a radially-extending bollard 17 on the outside of the fuel can 12, whence the cable 16 leads up and eventually out of the fuel channel 11 to temperature-indicating equipment (not shown).

A loop 18 is formed in the cable 16 above the bollard 17, and above the loop 18 there is a straightening device comprising an integral projection 19 on the side of one of the splitters 14 and having a conical hole 20 (FIG. 3) formed longitudinally therein.

The hole 20 preferably has a flared mouth 21 at its wide end, which is the end nearest the loop 18. It also preferably has a relatively short straight portion 22 (of substantially the same diameter as the cable 16) above its narrow end.

In operation, before the fuel element 10 is removed from the fuel channel 11, the thermocouple cable 16 must be separated from the fuel element. The cable is therefore pulled upwardly under a predetermined tension, and breaks at the loop 18, leaving the portion of cable which was between the loop 18 and thermocouple 15 secured to the fuel element by means of the bollard 17.

The broken end of the main portion of the cable, which continues to be drawn upwardly, has a hook due to the break having occurred at the loop, as is indicated in FIG. 3 at 23. As the broken end of the cable passes up through the conical hole 20, however, the hook 23 is thereby straightened out, so that the cable is straight when the broken end emerges from the top of the straightening device.

Figure 4:
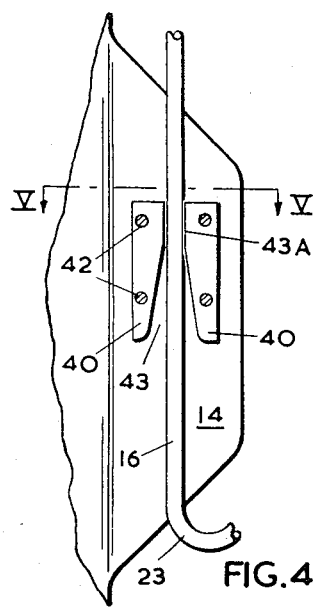
FIG. 4 is an elevational view of part of another fuel element showing a straightening device in an alternative form according to the invention.
Figure 5:
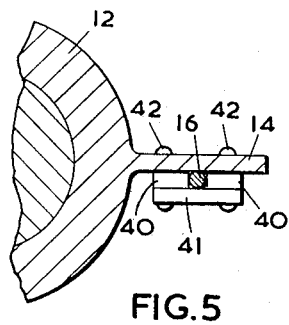
FIG. 5 is a sectional view taken on the line V—V of FIG. 4.

With reference now to FIGS. 4 and 5, an alternative form of straightening device comprises two tapered plates 40, secured side by side (but separated by a space 43) and sandwiched between an outer plate 41 and one of the splitter plates 14. The device is held together by rivets 42 or other suitable means. In FIG. 4 the outer plate 41 is omitted for clarity. The plates 40 are so shaped that when the hook 23 is drawn upwardly through the straightening device, it is straightened out due to the decreasing width of the space 43 between the plates 40, the upper end 43A of the space 43 being not appreciably wider than the diameter of the cable.

It will be understood that fuel elements according to the invention are not confined to those having the two forms of straightener device described herein. Any suitable form of straightener device may be employed wihtin the scope of the invention, and may be attached to or integral with the fuel can or any other suitable part of the fuel assembly: for example it might be attached to an arm of a sprung-arm spider arranged above the top end of the fuel element.

Fuel elements according to the invention are not confined to those which are arranged vertically in the fuel channel. They may be used for example in cases where the thermocouple cable is withdrawn vertically downwards or horizontally.

Fuel elements according to the invention may be stacked in the fuel channel so that there are in the fuel channel several fuel elements, each having a straightening device associated with it. Alternatively, where several thermocouple cables are bunched together, a single straightening device may be provided in a suitable position for straightening the broken ends of some or all of the cables.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What I claim as my invention and desire to secure by Letters Patent is:

1. A nuclear reactor fuel element assembly comprising a fuel element, a thermocouple hot junction attached thereto, a cable attached to said hot junction and leading along the fuel element towards a point remote therefrom, cable straightening means on said fuel element, a free loop being formed in said cable between said straightening means and said hot junction, and securing means on the fuel element adjacent the cable between a middle point of said loop and said hot junction, the cable being secured to said securing means and passing through said straightening means, so that on application of tension to said cable the loop breaks at said middle point to form a hooked broken end on the portion of the cable passing through the straightening means and so that on withdrawal of said portion of the cable the straightening means straightens said hooked end.

2. A nuclear reactor fuel element assembly according to claim 1, wherein said fuel element has formed therein a tapered passage having a wider end nearest said loop and a narrower end the width of which is substantially the same as the diameter of said cable passing through said passage.

3. A nuclear reactor fuel element assembly according to claim 1, wherein said straightening means comprises a block integral with said fuel element and having a tapered passage therein, a wider end of which is nearest said loop and a narrower end of which has a width substantially the same as the diameter of said cable passing through said passage.

4. A nuclear reactor fuel element assembly according to claim 2, further comprising a pair of guide plates secured in a spaced relationship on said fuel element and having divergent sides so as to define two sides of said passage and a further plate secured over said guide plates so as to sandwich the guide plates between said further plate and the fuel element so as to define two remaining sides of said passage.

5. A nuclear reactor fuel element assembly according to claim 1, in which said fuel element comprises a fuel-containing metallic can and integral radial splitter fins on the can, wherein said straightening means is on a said splitter fin.

References Cited

UNITED STATES PATENTS

| 3,021,274 | 2/1962 | Fifield et al. | 176—19 |
| 3,051,641 | 8/1962 | Guneratne et al. | 176—68 X |
| 3,144,394 | 8/1964 | Fifield | 176—68 |
| 3,239,425 | 3/1966 | Guneratne | 176—68 X |

FOREIGN PATENTS 958,169   5/1964   Great Britain.

CARL D. QUARFORTH, *Primary Examiner.*

M. J. SCOLNICK, *Assistant Examiner.*